(12) United States Patent
Pahlevaninezhad et al.

(10) Patent No.: US 8,723,487 B2
(45) Date of Patent: May 13, 2014

(54) ZERO VOLTAGE SWITCHING INTERLEAVED BOOST AC/DC CONVERTER

(76) Inventors: Majid Pahlevaninezhad, Kingston (CA); Praveen Jain, Kingston (CA)

( * ) Notice: Subject to any disclaimer, the term of this patent is extended or adjusted under 35 U.S.C. 154(b) by 107 days.

(21) Appl. No.: 13/415,931

(22) Filed: Mar. 9, 2012

(65) Prior Publication Data

US 2013/0235631 A1 Sep. 12, 2013

(51) Int. Cl.
  *H02M 1/42* (2007.01)
  *H02M 7/02* (2006.01)
(52) U.S. Cl.
  USPC ........... 323/225; 323/207; 323/208; 323/272; 363/89
(58) Field of Classification Search
  CPC ..... H02M 1/42; H02M 2001/42; H02M 7/00; H02M 7/02; H02M 2007/00; H02M 2007/02; H02M 3/158; H02M 3/1584
  USPC ................. 323/205, 207, 208, 225, 271, 272; 363/65, 89, 125, 126
  See application file for complete search history.

(56) References Cited

U.S. PATENT DOCUMENTS

| | | | | |
|---|---|---|---|---|
| 5,418,704 | A * | 5/1995 | Hua et al. | 323/282 |
| 5,847,548 | A * | 12/1998 | He et al. | 323/222 |
| 5,991,174 | A * | 11/1999 | Farrington et al. | 363/56.11 |
| 6,091,233 | A * | 7/2000 | Hwang et al. | 323/222 |
| 7,049,793 | B2 * | 5/2006 | Itoh et al. | 323/222 |
| 7,183,754 | B2 * | 2/2007 | Tsuruya | 323/272 |
| 8,203,322 | B2 * | 6/2012 | Okubo et al. | 323/285 |
| 8,456,139 | B2 * | 6/2013 | Phadke | 323/222 |
| 8,564,982 | B2 * | 10/2013 | Song et al. | 363/44 |
| 8,654,552 | B2 * | 2/2014 | Shin et al. | 363/89 |

OTHER PUBLICATIONS

R. Streit and D. Tollik, "High Efficiency Telecom Rectifier Using a Novel Soft-Switched Boost-Based Input Current Shaper", ITELEC'91, IEEE, 720-726, 1991.
K. Smith and K. Smedley, "A Comparison of Voltage-Mode Soft-Switching Methods for PWM Converters", IEEE Transactions on Power Electronics, vol. 12, No. 2, 376-386, 1997.
C. Tseng and C. Chen, "Novel ZVT-PWM Converters with Active Snubbers", IEEE Transactions on Power Electronics, vol. 13, No. 5, 861-869, 1998.
R. Giral et al., "Interleaved Converters Operation Based on CMC", IEEE Transactions on Power Electronics, vol. 14, No. 4, 643-652, 1999.
G. Moschopoulos et al., "A Zero-Voltage-Switched PWM Boost Converter with an Energy Feedforward Auxiliary Circuit", IEEE Transactions on Power Electronics, vol. 14, No. 4, 653-662, 1999.
T. Kim et al., "An Improved ZVT PWM Boost Converter", Kum-oh University of Technology, School of Electronics, South Korea, IEEE, 615-619, 2000.

(Continued)

*Primary Examiner* — Gary L Laxton
(74) *Attorney, Agent, or Firm* — Brion Raffoul

(57) ABSTRACT

Circuits and methods relating to the provision of a reactive current to ensure zero voltage switching in a boost power factor correction converter. A simple passive circuit using a series connected inductor and capacitor are coupled between two phases of an interleaved boost PFC converter. The passive circuit takes advantage of the 180° phase-shift between the two phases to provide reactive current for zero voltage switching. A control system for adjusting and controlling the reactive current to ensure ZVS for different loads and line voltages is also provided.

14 Claims, 11 Drawing Sheets

(56) References Cited

OTHER PUBLICATIONS

M. Martins et al., "A ZVT PWM Boost Converter using an Auxiliary Resonant Source", Power Electronics and Control Research Group, Federal University of Santa Maria, Brazil, IEEE, 1101-1107, 2002.

N. Jain et al., "A Zero Voltage Transition Boost Converter Employing a Soft Switching Auxiliary Circuit With Reduced Conduction Losses", IEEE Transactions on Power Electronics, vol. 19, No. 1, 130-139, 2004.

C. Wang, "A Novel Zero-Voltage-Switching PWM Boost Rectifier With High Power Factor and Low Conduction Losses", IEEE Transactions on Power Electronics, vol. 52, No. 2, 427-435, 2005.

G. Moschopoulos and W. Huang, "A New Family of Zero-Voltage-Transition PWM Converters with Dual Active Auxiliary Circuits", University of Western Ontario, Department of Electrical & Computer Engineering, London, Ontario, IEEE, 1251-1257, 2005.

G. Yao et al., "Soft Switching Circuit for Interleaved Boost Converters", IEEE Transactions on Power, Electronics, vol. 22, No. 1, 80-86, 2007.

Y. Jang and M. Jovanovic, "Interleaved Boost Converter With Intrinsic Voltage-Doubler Characteristic for Universal-Line PFC Front End", IEEE Transactions on Power Electronics, vol. 22, No. 4, 1394-1401, 2007.

T. Nussbaumer and J. Kolar, "Comparison of 3-Phase Wide Output Voltage Range PWM Rectifiers", IEEE Transactions on Industrial Electronics, vol. 54, No. 6, 3422-3425, 2007.

S. Lukic et al., "Energy Storage Systems for Automotive Applications", IEEE Transactions on Electronics, vol. 55, No. 6, 2258-2267, 2008.

A. Emadi et al., "Power Electronics and Motor Drives in Electric, Hybrid Electric, and Plug-In Hybrid Electric Vehicles", IEEE Transactions on Industrial Electronics, vol. 55, No. 6, 2237-2245, 2008.

T. Nussbaumer et al., "Comparative evaluation of modulation methods of a three-phase buck+boost PWM rectifier. Part II: Experimental verification", IET Power Electron., vol. 1, No. 2, 268-274, 2008.

L. Huber et al., "Open-Loop Control Methods for Interleaved DCM/CCM Boundary Boost PFC Converters", IEEE Transactions on Power Electronics, vol. 23, No. 4, 1649-1657, 2008.

P. Das, "A Study of AC-DC ZVS-PWM Boost Converters with Silicon Carbide Diodes", IEEE, 1158-1164, 2009.

T. Nussbaumer et al., "Design Guidelines for Interleaved Single-Phase Boost PFC Circuits", IEEE Transactions on Industrial Electronics, vol. 56, No. 7, 2559-2573, 2009.

Y. Lee et al., "Advanced Integrated Bidirectional AC/DC and DC/DC Converter for Plug-In Hybrid Electric Vehicles", IEEE Transactions on Vehicular Technology, vol. 58, No. 8, 3970-3980, 2009.

\* cited by examiner

ZERO VOLTAGE SWITCHING INTERLEAVED BOOST AC/DC CONVERTER

TECHNICAL FIELD

The present invention relates to circuits and power supplies. More specifically, the present invention relates to circuits and methods for use in AC/DC converters which can be used to ensure zero voltage switching.

BACKGROUND OF THE INVENTION

The ever growing popularity of environmentally friendly or "green" products and services has led to a renewed interest in the electric car. While the practical, fully electric powered car might still be a few years in the future, its cousin, the hybrid car is already being used by the general public. Both these types of vehicles have their batteries usually recharged by plugging into regular 120V or 220V wall sockets. Developments that affect battery charging systems would therefore have a great impact on these types of vehicles.

Electric Vehicle (EV) power conditioning systems usually utilize a high energy battery pack to store energy for the electric traction system. A typical block diagram of the power conditioning system in an EV is shown in FIG. 1. The high energy battery pack is charged from a utility AC outlet. This energy conversion during the battery charging is performed by an AC/DC converter. Such AC/DC converters include a front-end boost converter, which performs input power factor correction (PFC) and AC/DC conversion, and a full-bridge DC/DC converter, for battery charging and galvanic isolation. PFC is useful for improving the quality of the input current, which is drawn from the power utility so as to comply with the regulatory standards like IEC1000-3-2.

Switching losses of the power switches in boost PFC AC/DC converters significantly deteriorate the efficiency of the converter. Present products usually use active auxiliary circuits in order to provide soft-switching, which increases the complexity of the system while decreasing its reliability.

One technique which can reduce switching losses is zero voltage switching. Most converters use MOSFETs (metal oxide semiconductor field effect transistors) in low to medium power applications (i.e. application involving a few kilowatts). In order to have robust and reliable operation, MOSFETs are preferably switched under zero voltage. Operating at Zero Voltage Switching (ZVS) decreases the converter switching losses and provides a noise free environment for the system control circuit. Loss of ZVS means extremely high switching losses at high switching frequencies and very high EMI. Loss of ZVS can also cause a very noisy control circuit, which leads to shoot-through and loss of the semiconductor switches.

There is therefore a need for solutions which lessen switching losses without the drawbacks of the prior art.

SUMMARY OF INVENTION

The present invention provides circuits and methods relating to the provision of a reactive current to ensure zero voltage switching in a boost power factor correction converter. A simple passive circuit using a series connected inductor and capacitor are coupled between two phases of an interleaved boost PFC converter. The passive circuit takes advantage of the 180° phase-shift between the two phases to provide reactive current for zero voltage switching. A control system for adjusting and controlling the reactive current to ensure ZVS for different loads and line voltages is also provided.

In a first aspect, the present invention provides a circuit for use in a power factor correction (PFC) converter circuit having a full bridge diode rectifier subcircuit, the circuit comprising:
first inductor coupled between a positive input node and a first intermediate node;
a second inductor coupled between said positive input node and a second intermediate node;
a first power transistor having a drain lead coupled to said first intermediate node and having a source lead coupled to a negative power node;
a second power transistor having a source lead coupled to said first intermediate node and a drain lead coupled to a positive output node;
a third power transistor having a drain lead coupled to said second intermediate node and having a source lead coupled to said negative power node;
a fourth power transistor having a source lead coupled to said second intermediate node and a drain lead coupled to said positive output node; and
an auxiliary inductor and an auxiliary capacitor coupled in series to one another between said first intermediate node and said second intermediate node;
wherein
said full bridge rectifier subcircuit is coupled between said positive input node and said negative power node;
a load to said circuit is coupled between said positive output node and said negative power node.

In a second aspect, the present invention provides a power factor correction AC/DC converter circuit comprising:
a full bridge diode rectifier subcircuit for receiving an input AC signal;
a first boost converter subcircuit;
a second boost converter subcircuit; and
a passive auxiliary subcircuit coupled between said first and second boost subcircuits, said passive auxiliary subcircuit being for providing reactive current to said boost converter subcircuits for zero voltage switching;
wherein
said first and second boost converter subcircuits are coupled in parallel to said rectifier subcircuit;
said passive auxiliary subcircuit comprises an auxiliary inductor and an auxiliary capacitor coupled in series to each other.

BRIEF DESCRIPTION OF THE DRAWINGS

The embodiments of the present invention will now be described by reference to the following figures, in which identical reference numerals in different figures indicate identical elements and in which:

FIG. 8 and FIG. 9 show the waveforms of the ZVS boost PFC converter FIG. 9 is an enlargement of FIG. 8 and shows zero voltage switching;

DETAILED DESCRIPTION OF THE INVENTION

Figure 1:
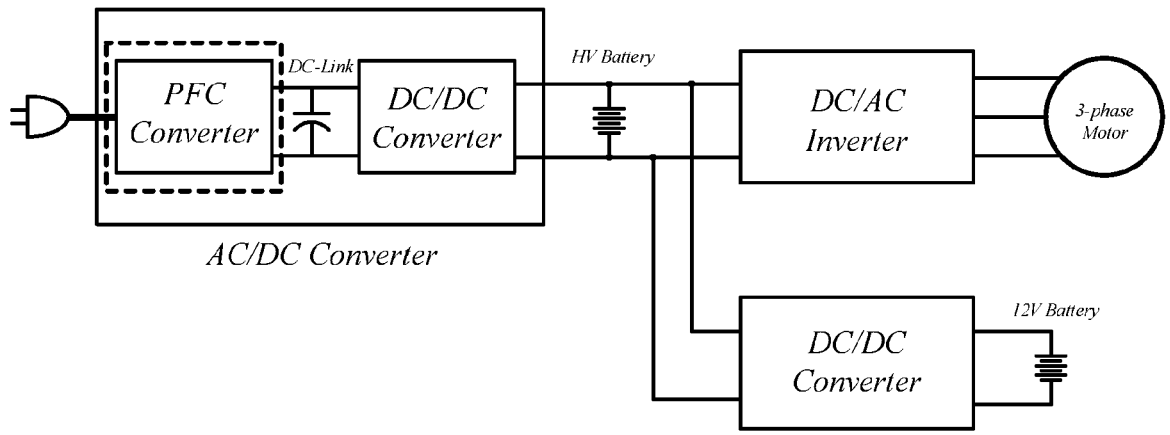
FIG. 1 is a block diagram of a typical power conditioning system for electric vehicles.

Referring to FIG. 1, a block diagram of a typical power conditioning system in an electric vehicle is illustrated. As can be seen, a wall plug is coupled to a PFC converter block which, in turn, is coupled to a DC/DC converter. The -PFC converter block and the DC/DC converter block, taken together, form the AC/DC converter block. The output of the AC/DC converter block is then received by a DC/DC converter and a DC/AC converter which, in turn, powers a 3 phase motor.

One aspect of the invention may be used in the PFC converter illustrated in FIG. 1. This aspect of the invention provides for a ZVS interleaved boost PFC AC/DC converter as described below. This aspect of the invention may be used in substantially any AC/DC converter application. It is, however, particularly useful in Electric Vehicle (EV) applications due to its superior performance and high efficiency. There are two main sources of losses in boost PFC converters: turn-on losses of the boost power switch and reverse recovery losses of the output diode. These losses deteriorate the efficiency and performance of the converter. This aspect of the invention provides soft switching for power semiconductors through an auxiliary circuit placed between the two phases of the converter. The auxiliary circuit provides reactive current to charge and discharge the output capacitors of the power semiconductors to achieve soft-switching and thereby minimize switching losses of the converter.

One aspect of the invention also maintains ZVS for the universal input voltage (85 Vrms to 265 Vrms), which includes a very wide range of duty ratios (0.07-1). In addition, the control system aspect of the invention optimizes the amount of reactive current required to guarantee ZVS during the line cycle for different load conditions. This optimization is useful as the converter may work at very light loads for a long period of time.

Figure 2:
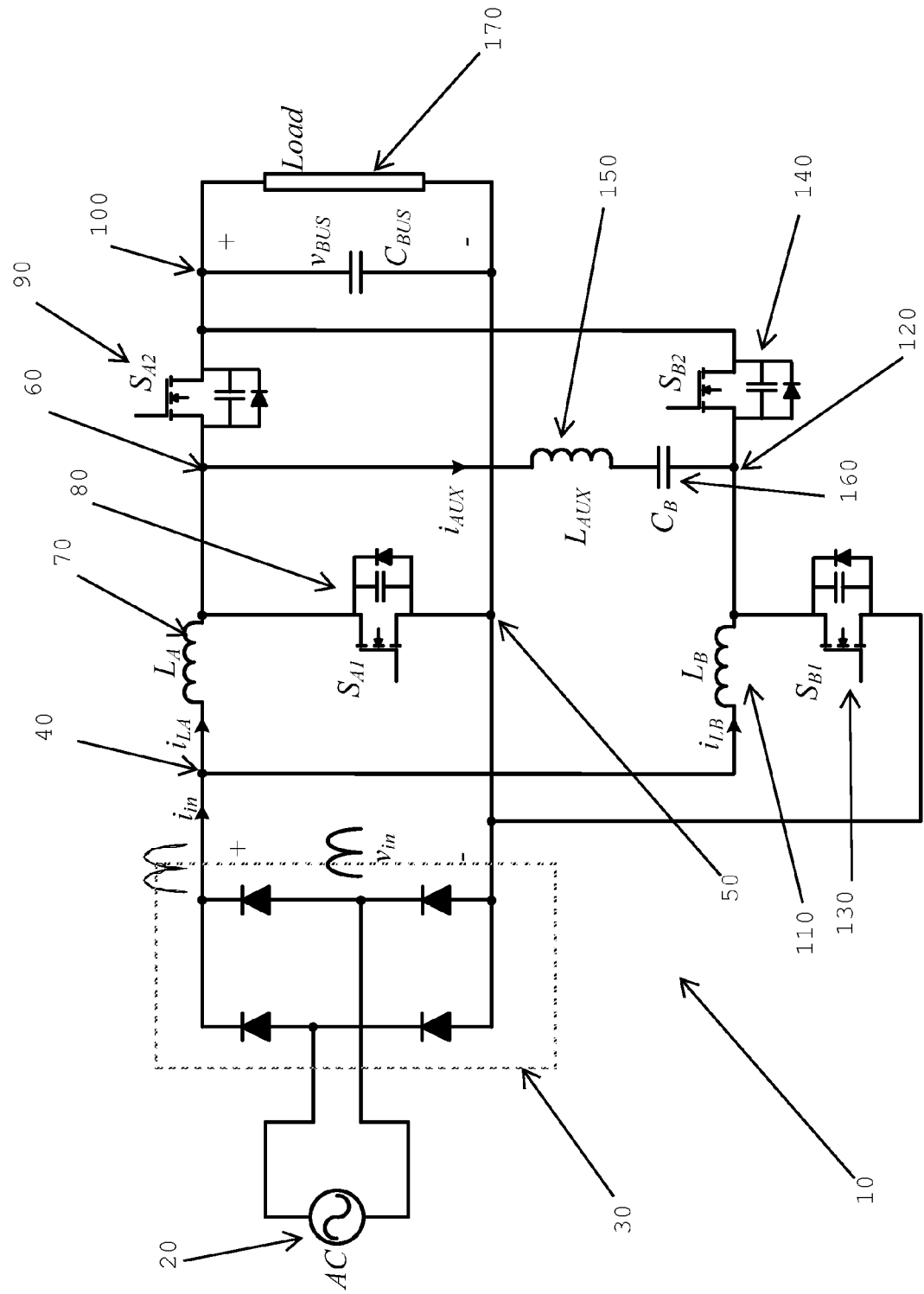
FIG. 2 is a circuit diagram of a circuit according to one aspect of the invention.

FIG. 2 illustrates a power circuit of the ZVS interleaved boost PFC converter according to one aspect of the invention. The circuit 10 has an input signal from an AC current source 20 (such as a wall plug). This signal is received by a full bridge diode rectifier 30 which is coupled between a positive input node 40 and a negative power node 50. Coupled between the positive input node 40 and a first intermediate node 60 is a first inductor 70. Coupled between the first intermediate node 60 and the negative power node 50 is a first power transistor 80. In a MOSFET implementation of the power transistor, the drain lead is coupled to the first intermediate node 60 and the source lead is coupled to the negative power node 50. A second power transistor 90 is coupled between the first intermediate node 60 and a positive output node 100. The second power transistor, in a MOSFET implementation, has its drain lead coupled to the positive output node 100 and its source lead coupled to the first intermediate node 60.

The circuit 10 in FIG. 2 also has a second inductor 110 coupled between the positive input node 40 and a second intermediate node 120. A third power transistor 130 is coupled between the second intermediate node 120 and negative power node 50. For a MOSFET implementation of the third power transistor, its source lead is coupled to the negative power node 50 while its drain lead is coupled to the second intermediate node 120. A fourth power transistor 140 is coupled between the positive output node 100 and the second intermediate node 120. For the MOSFET implementation, the fourth power transistor has its drain lead coupled to the positive output node 100 and its source lead is coupled to the second intermediate node 120. As can be seen, each power transistor (or boost power transistor) has a snubber capacitor and a diode associated with it. For this circuit, the output capacitors, are the combination of each MOSFETs' output capacitors and the snubber capacitors in parallel with MOSFETs, placed to remove turn-off losses.

The circuit 10 further has an auxiliary inductor 150 and an auxiliary capacitor 160 coupled in series to one another. This series connected auxiliary circuit is coupled between the first intermediate node 60 and the second intermediate node 120. The load 170 to the circuit 10 is coupled between the positive output node 100 and the negative power node 50.

Figure 2A:
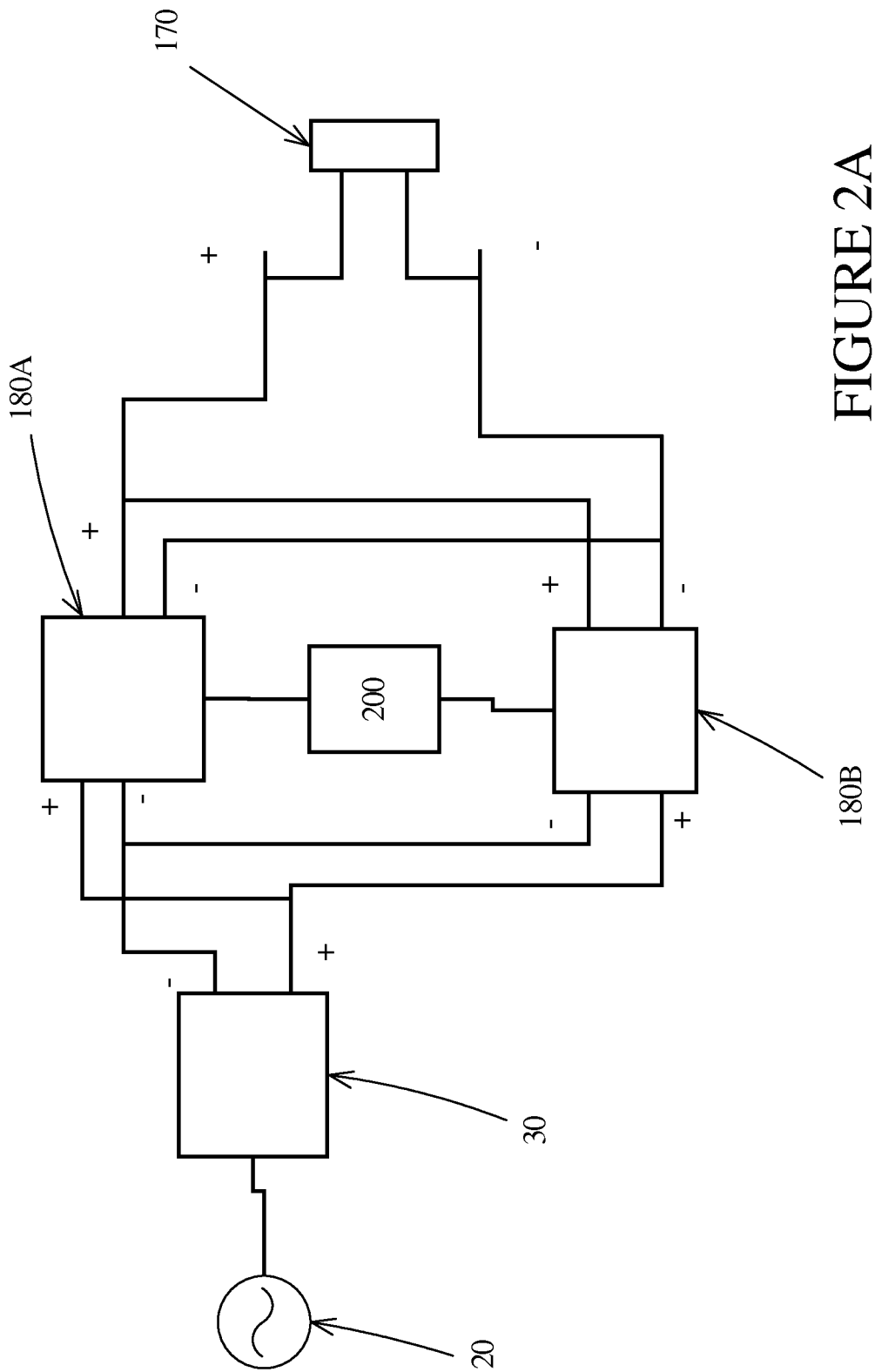
FIG. 2A is a block diagram of the circuit of FIG. 2.

Referring to FIG. 2A, the circuit 10 can be seen as having two boost converter subcircuits 180A, 180B coupled to a full bridge diode rectifier subcircuit 30. The auxiliary subcircuit 200 is coupled between the two boost converter subcircuits 180A, 180B. Of course, the auxiliary subcircuit 200 has the auxiliary inductor 150 and auxiliary capacitor 160.

In this circuit, two boost converters subcircuits operate with a 180° phase-shift in order to reduce the input current ripple. This 180° phase-shift can be used to provide reactive current in order to implement ZVS for the power MOSFETs. A simple passive auxiliary subcircuit 200 is used to provide reactive current as shown in FIGS. 2 and 2A. This auxiliary subcircuit 200 consists of a high frequency inductor 150 and a DC-blocking capacitor 160. The DC-blocking capacitor is used to avoid having DC current flow through the auxiliary subcircuit 200. Since there may be a slight difference between the duty ratios of the two phases, this capacitor is necessary to eliminate any DC current arising from the mismatch of the duty ratios of the main switches in the practical circuit.

Figure 3:
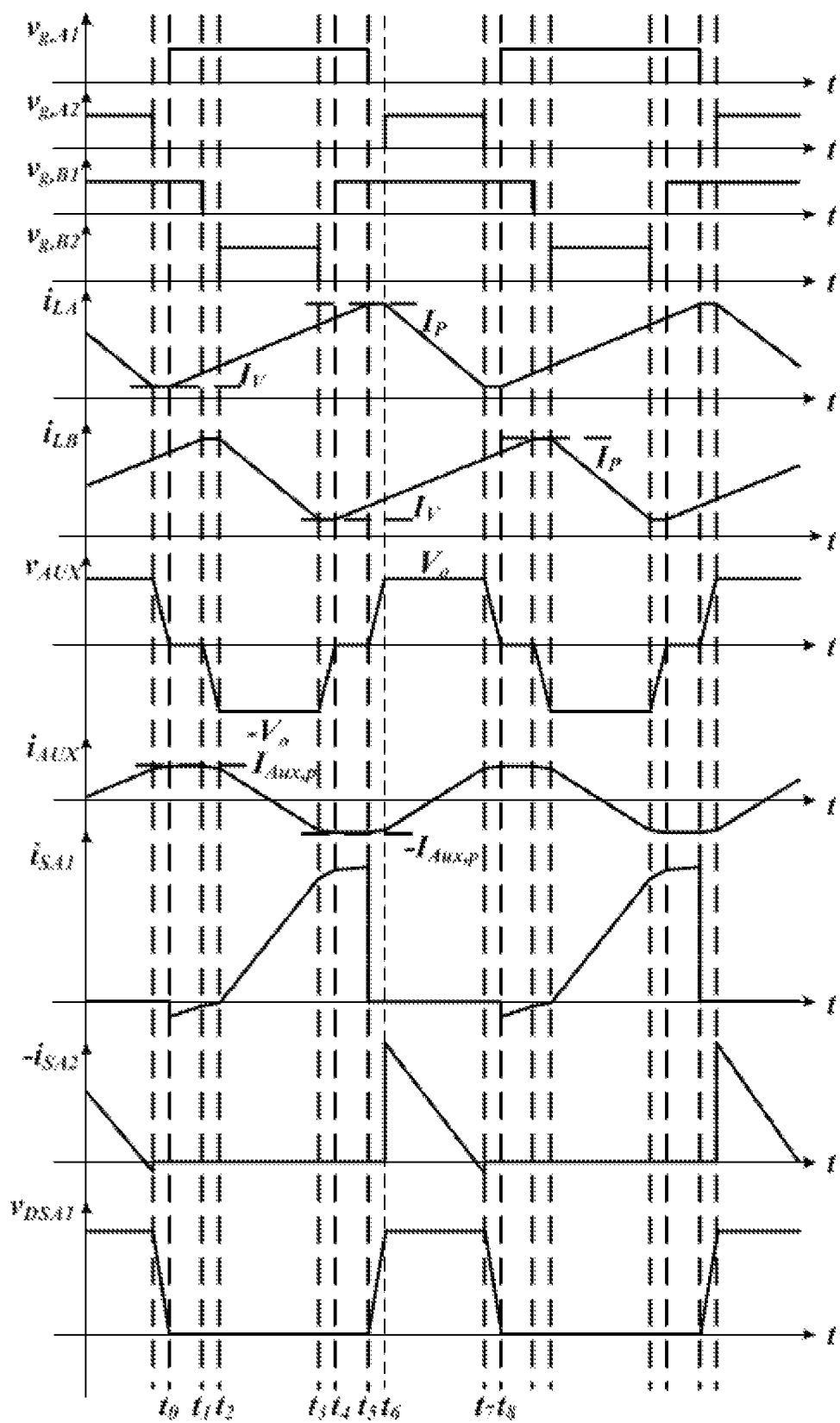
FIG. 3 illustrates timing waveforms for the circuit in FIG. 2 for duty cycles greater than 50%.
Figure 4:
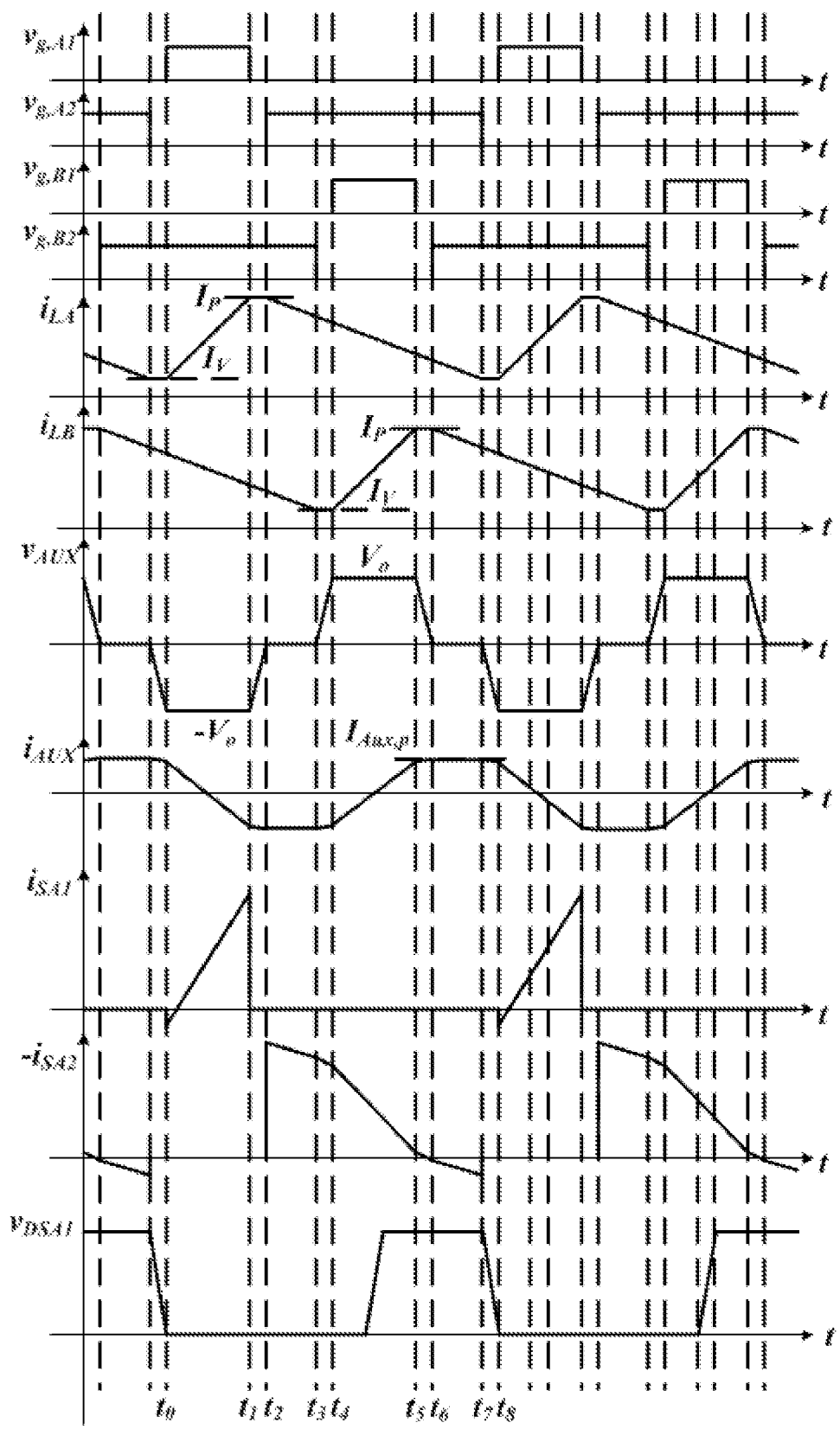
FIG. 4 illustrates timing waveforms for the circuit in FIG. 2 for duty cycles less than 50%.

FIG. 3 shows the waveforms for the converter circuit for duty cycles greater than 50% while FIG. 4 shows the waveforms for the converter for duty cycles less than 50%. The characteristics and benefits of the circuit can be seen from these waveforms. According to these figures, there are eight operating modes in one switching cycle of the converter.

From FIGS. 3 and 4, it can be seen that the circuit provides a very simple and practical way to provide ZVS for the power MOSFETs. The peak value of the auxiliary circuit current adaptively changes during the line cycle. The peak value of the auxiliary circuit current is very small near the zero crossing points where a small amount of current is required to guarantee ZVS. On the other hand, the peak value of the auxiliary circuit current is at its maximum for the peak points where the auxiliary circuit current should neutralize the input current. This solution is very practical for automotive applications, since the power circuit can be implemented by the commonly used full-bridge MOSFETs and the only additional components are a small DC-blocking capacitor and a small high frequency inductor. H-bridge power modules are the standard building blocks in automotive applications.

Figure 5:
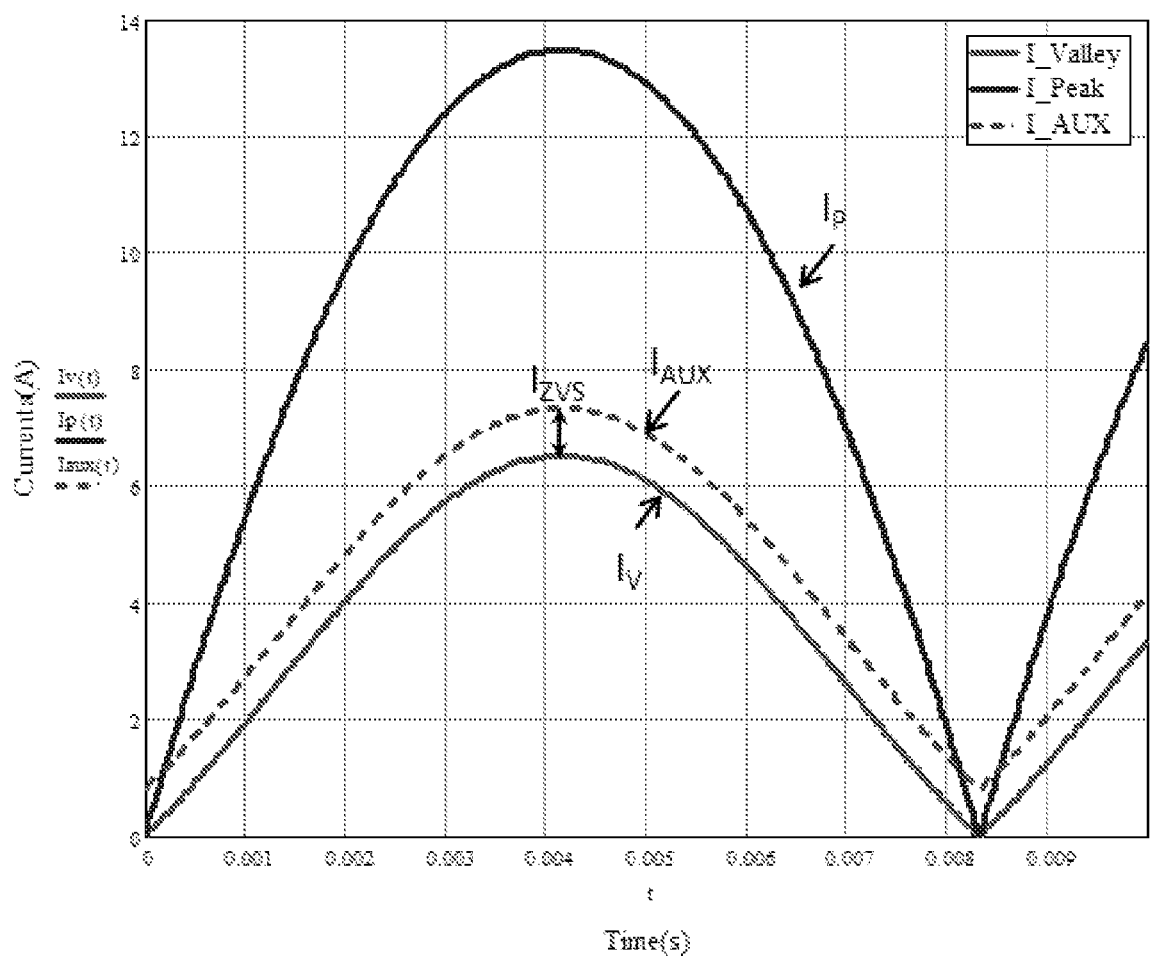
FIG. 5 shows current waveforms for the auxiliary circuit used in the circuit of FIG. 2.

FIG. 5 shows the boost inductor valley current, peak current and the envelope of the auxiliary inductor current. In order to guarantee ZVS, the auxiliary inductor current should not only neutralize the valley current, $I_V$, but should also provide enough current to charge and discharge the output capacitors. The valley current, $I_V$, and the peak current, $I_P$, are given by Equations 1 and 2:

$$I_V(t) = \frac{P_{in}}{V_{in}} \cdot |\text{Sin}(\omega_l \cdot t)| - \frac{V_{in} \cdot |\text{Sin}(\omega_l \cdot t)| \cdot \left(1 - \frac{V_{in} \cdot |\text{Sin}(\omega_l \cdot t)|}{V_o}\right)}{2L_A \cdot f_s}$$

$$I_P(t) = \frac{P_{in}}{V_{in}} \cdot |\text{Sin}(\omega_l \cdot t)| + \frac{V_{in} \cdot |\text{Sin}(\omega_l \cdot t)| \cdot \left(1 - \frac{V_{in} \cdot |\text{Sin}(\omega_l \cdot t)|}{V_o}\right)}{2L_A \cdot f_s}$$

The peak value of the auxiliary inductor current, $I_{Aux,p}$, is given by Equation 3:

$$I_{Aux,p}(t) = \frac{P_{in}}{V_{in}} \cdot |\text{Sin}(\omega_l \cdot t)| - \frac{V_{in} \cdot |\text{Sin}(\omega_l \cdot t)| \cdot \left(1 - \frac{V_{in} \cdot |\text{Sin}(\omega_l \cdot t)|}{V_o}\right)}{2L_A \cdot f_s} + \frac{2C_{So} \cdot V_o}{t_d}$$

Therefore, the envelope of the auxiliary circuit current should be controlled so as to follow the sinusoidal waveform as shown in FIG. 5 to optimize the amount of reactive current.

Figure 6:
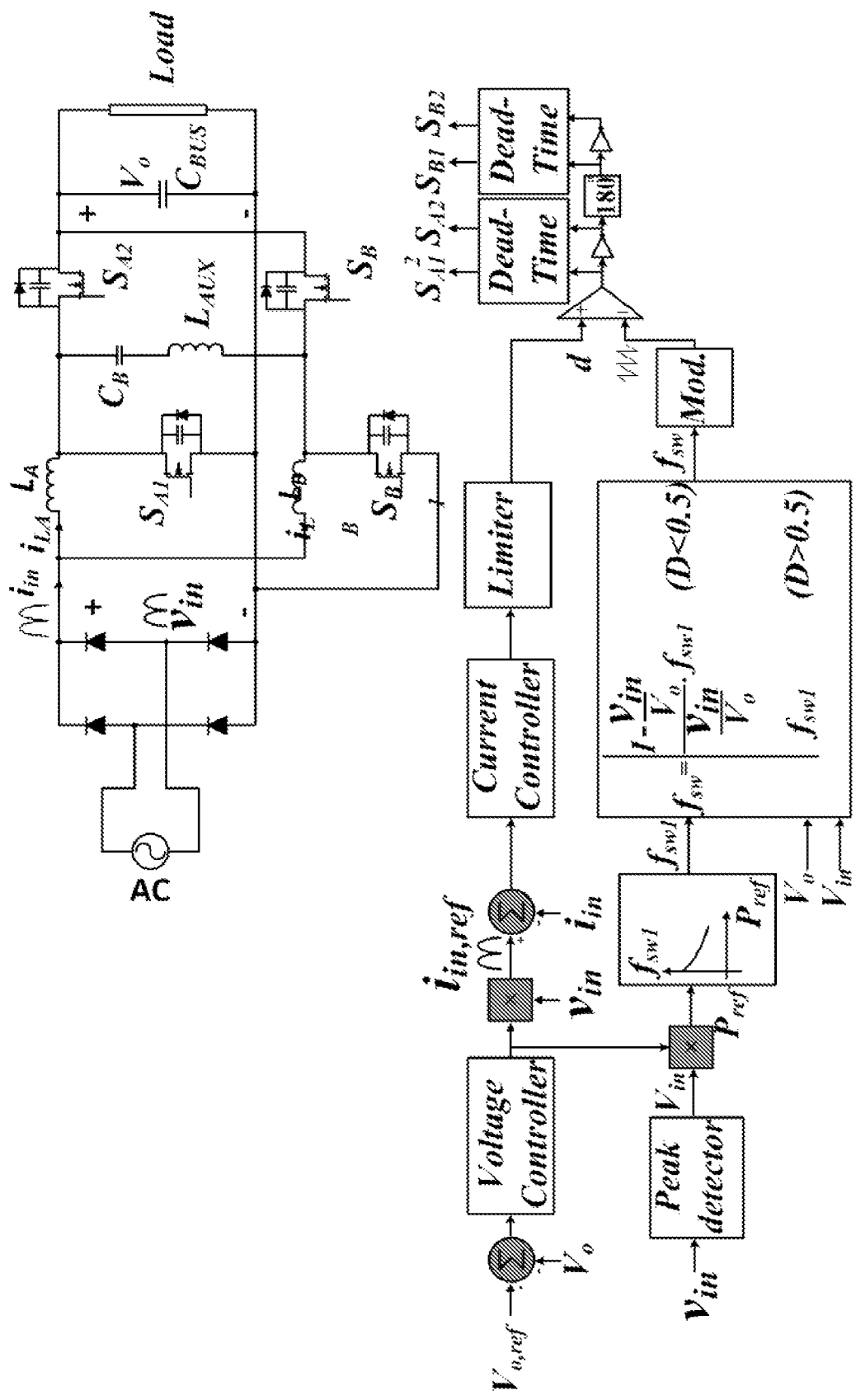
FIG. 6 is a block diagram of a control system for the circuit in FIG. 2.

FIG. 6 shows the block diagram of the control system for the circuit. The control system includes an external voltage loop, an internal current loop, and a switching frequency control loop. The frequency loop is added to the control system to optimize the circulating current of the auxiliary circuit based on the load condition and duty ratio of the converter. As can be seen, the outputs of the control system are signals to be sent to the gate leads of the various boost power transistors of the circuit in FIG. 2. The control system therefore controls when, how often, and how long the power transistors in the circuit are activated or are in active mode.

At heavy loads, the switching frequency is lower in order to provide more reactive current in the auxiliary circuit to overcome higher values of $I_V$ and to charge and discharge the output capacitors. At light loads, the switching frequency is higher in order to reduce the auxiliary current so that any extra circulating current between the two phases can be avoided. The required auxiliary circuit current for different loads is determined by:

$$I_{Aux,p} = I_{ref} - \frac{\Delta i_{LA}}{2} + \frac{2C_{So} \cdot V_o}{t_d} \quad \text{Equation 4}$$

For Equation 4 and subsequent equations, $C_{So}$ is the combination of the power transistor capacitance and the snubber capacitance. Or, in equation terms, $C_{So} = C_{oss}(\text{MOSFET}) + C_{Snubber}$.

The auxiliary circuit current is given by:

$$I_{Aux,p} = \frac{v_{in}}{2L_{AUX} \cdot f_s} \quad \text{Equation 5}$$

The boost inductor ripple is given by:

$$\Delta i_{LA} = \frac{v_{in} \cdot \left(1 - \frac{v_{in}}{V_o}\right)}{L_A \cdot f_s} \quad \text{Equation 6}$$

Inserting Equation 4 and Equation 6 into Equation 5 determines the desired switching frequency of the converter:

$$f_{s1} = \frac{v_{in} \cdot L_A + v_{in} \cdot \left(1 - \frac{v_{in}}{V_o}\right) \cdot L_{AUX}}{I_{ref} + \frac{2C_{So} \cdot V_o}{t_d}} \quad \text{Equation 7}$$

For the circuit in FIG. 2, all the power transistors have the same switching frequency. This switching frequency is determined in two stages. In the first stage, the switching frequency is determined based on the amount of load on the circuit. For the second stage, the switching frequency is modified during the line cycle when the duty ratio becomes lower than 0.5.

Figure 7:
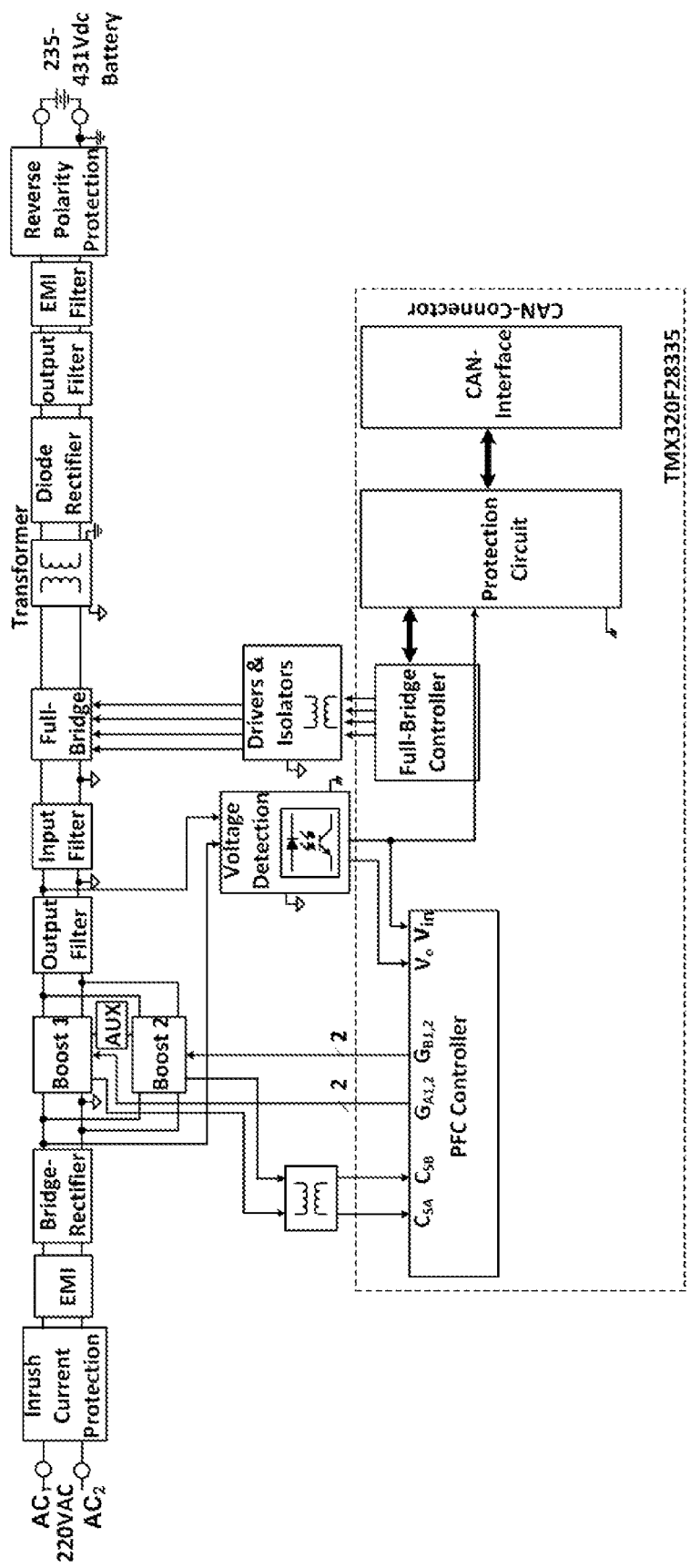
FIG. 7 is a system block diagram of an implementation of one aspect of the invention.

A 3 KW prototype was implemented to verify the performance of the converter. The converter specifications are shown in Table I and the designed parameters are given in Table II. (see below) FIG. 7 illustrates the system block diagram. For the main controller, a DSP board from Texas Instruments (eZdSP TMS320F28335) was used. Of course, other types, makes, and models of devices may also be used as the controller. Referring to FIG. 7, aat the input stage, there is inrush current protection, which limits the inrush current of the converter. Since there is usually a large capacitor at the output of the PFC, the inrush current to charge the capacitor is very high and a circuit is required to limit this current. The next block is the EMI filter, which is designed to comply with the EMI standard (CISPR25/12) for electric vehicles. The following block is the input diode rectifier. It rectifies the input voltage for the two-phase interleaved boost converter. The interleaved boost converter converts the rectified input voltage to the intermediate DC-bus voltage. The output capacitor of the interleaved boost converter is large (in this implementation the capacitor had a capacitance of 1.4 mF) in order to decrease the $2^{nd}$ harmonic voltage ripple caused by the power ripple of the input boost PFC converter. In addition, there is a differential-Mode (DM) filter at the output of the PFC in order to filter out the differential-mode noise. At the output of this filter, a clean DC-bus voltage is provided to the full-bridge converter. Note that another EMI filter is preferable at the output of the full-bridge converter in order to provide filtering for the EMI noise injected by the inverter. Since the inverter is connected to the high energy battery, it injects switching noise to the battery charger.

TABLE I

Converter specification.

| Symbol | Parameter | Value |
|---|---|---|
| Po | Output Power | 3 KW |
| Vac | Input Voltage | 170-267 VAC |
| Vo | Output Voltage | 235-431 VDC |
| $f_{sb}$ | Interleaved boost switching frequency | 44-148 KHz |
| $f_{sf}$ | Full-Bridge Switching Frequency | 220 KHz |
| $I_{in\,(max)}$ | Maximum input current | 16A |

TABLE I-continued

Converter specification.

| Symbol | Parameter | Value |
| --- | --- | --- |
| $I_{inrush}$ | Maximum inrush current | 32A |
| P.F. | Power Factor | >98% |

TABLE II

System parameters.

| Symbol | Parameter | Value |
| --- | --- | --- |
| $L_A, L_B$ | Boost Inductors | 270 uH |
| $C_o$ | Output Capacitor | 1.4 mF |
| $S_{A1}, S_{A2},$ $S_{B1}, S_{B2}$ | MOSFETs | STx25NM50N |
| $D_{BR}$ | Bridge Rectifier | 20ETF06pbF |
| $L_{AUX}$ | Auxiliary Inductor | 120 uH |

Figure 8:
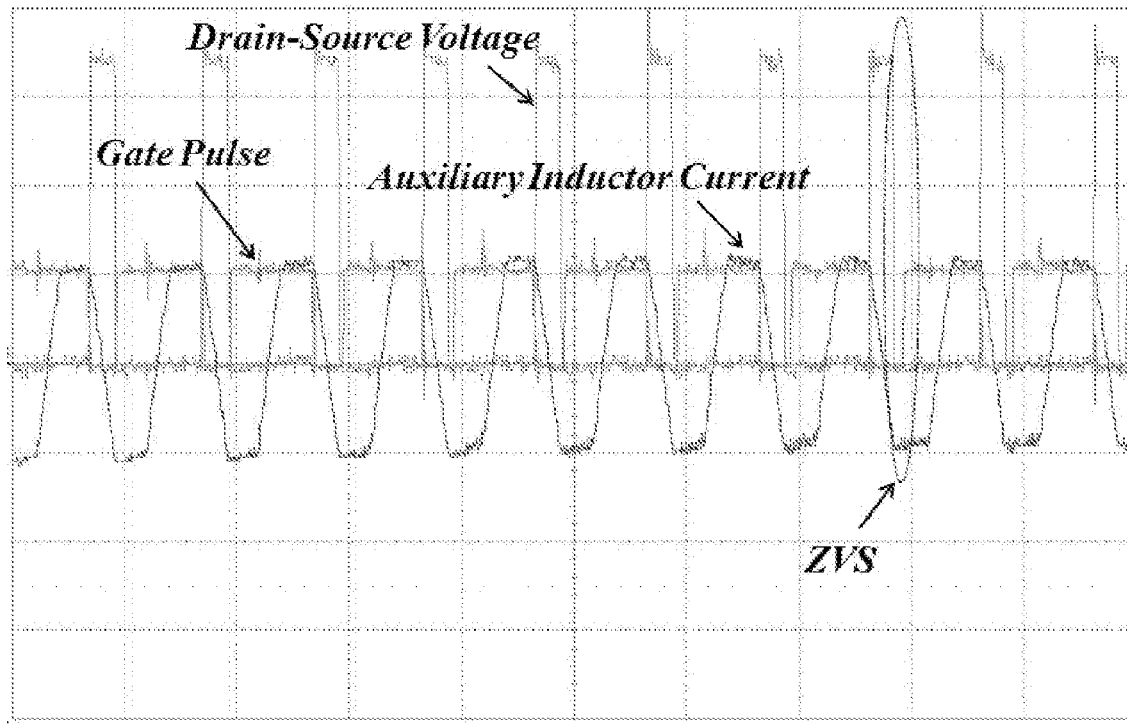
FIG. 8 illustrate the current and voltage waveforms for the circuit in FIG. 2.
Figure 9:
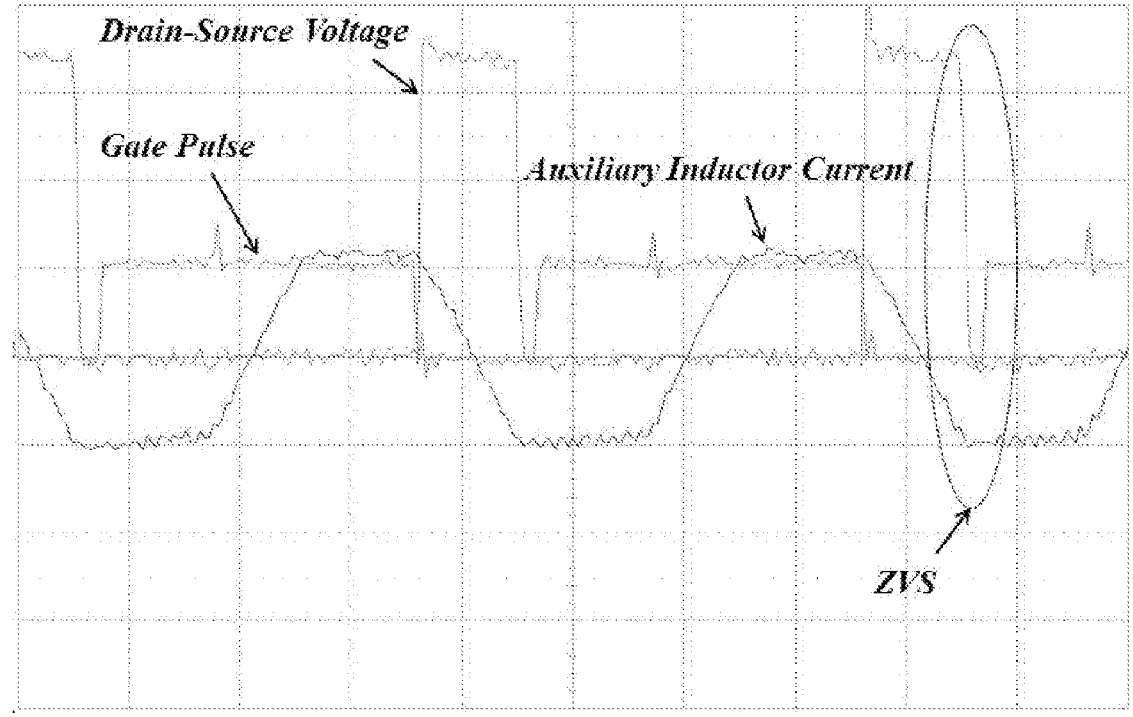

FIG. 8 and FIG. 9 show the waveforms of the ZVS boost PFC converter. According to these figures, the boost MOSFET is turned-on under zero voltage. This is due to the negative current provided by the auxiliary circuit. Having the MOSFETs at the output side guarantees the appropriate waveforms across the auxiliary circuit and avoids any unwanted turn-on of the output diodes prior to the boost MOSFET turn-on. FIG. 9 is the enlarged version of FIG. 8. This figure shows that the output capacitor of the boost MOSFET is completely discharged prior to applying the gate signal and once the voltage across the MOSFET has become zero the gate signal is applied to the MOSFET.

Figure 10:
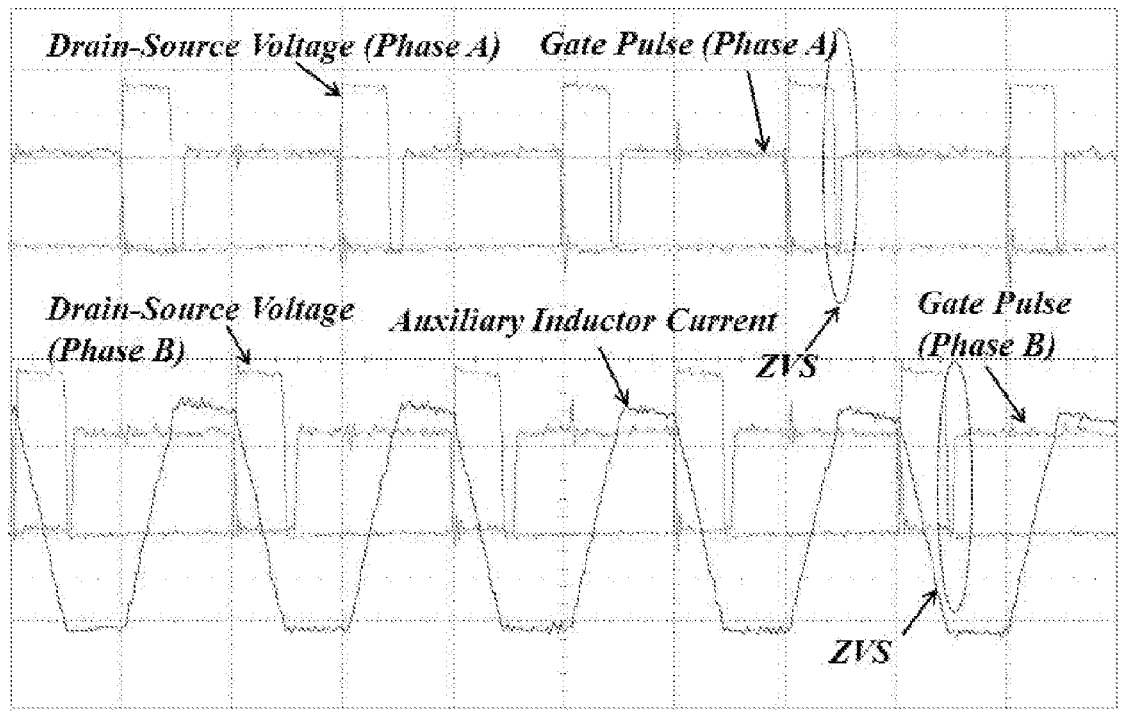
FIG. 10 illustrates waveforms for the two phases of the circuit in FIG. 2 along with the auxiliary circuit current.

FIG. 10 shows the waveforms of the two phases of the interleaved boost PFC converter as well as the auxiliary circuit current. As can be seen from the figure, the auxiliary circuit provides reactive current that activates the power transistors for both phases at the same time.

Figure 11:
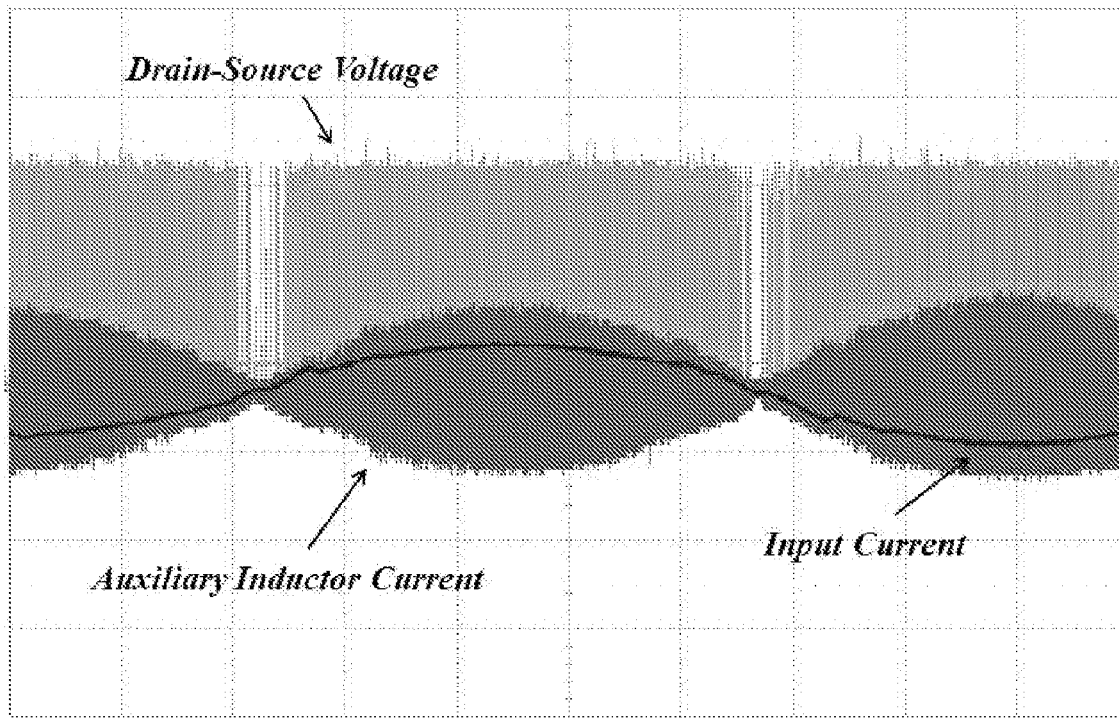
FIG. 11 shows the auxiliary inductor current and how it changes with changes in the input current.

FIG. 11 illustrates that the auxiliary circuit current changes during a line cycle based on the input current. The auxiliary circuit current is at its minimum at the zero crossing points of the input current and it is at its maximum at the peak of the input current. This implies that the auxiliary circuit current adaptively changes based on the shape of the input current and is optimized over the line cycle.

Figure 12:
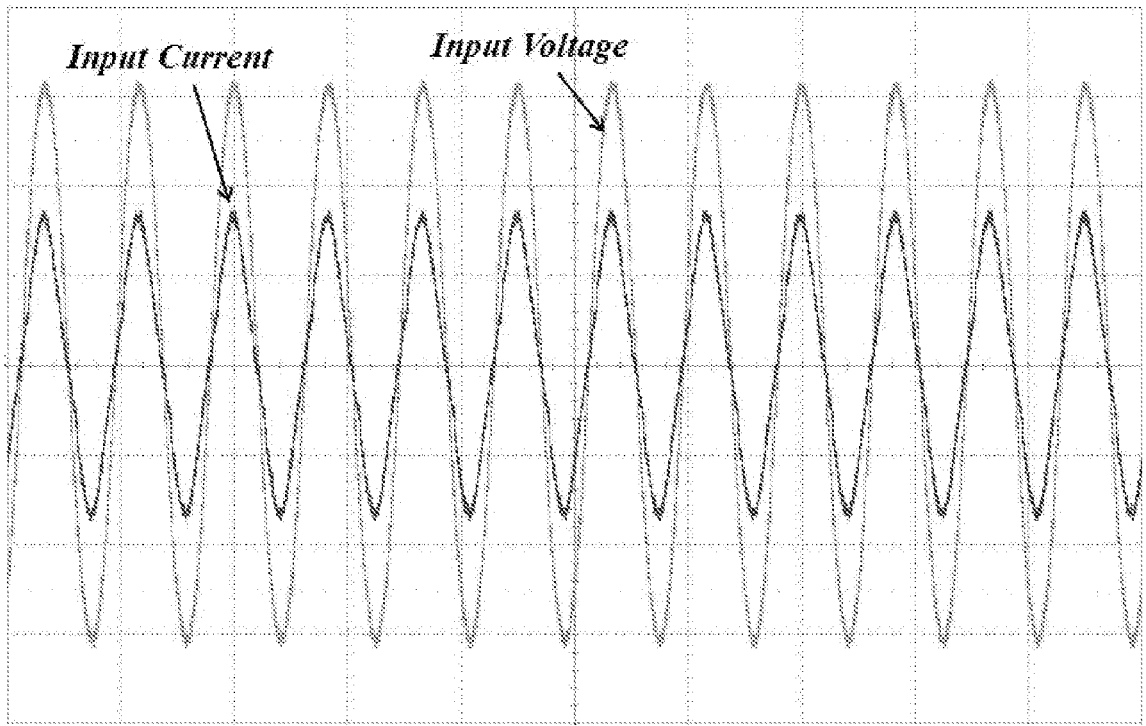
FIG. 12 illustrates the input voltage and the input current for full-load for the circuit illustrated in FIG. 2.

FIG. 12 shows the input voltage and the input current for full-load. It can be seen that the input current and input AC voltage are in phase, thus maintaining a near unity (0.999) power factor.

Figure 13:
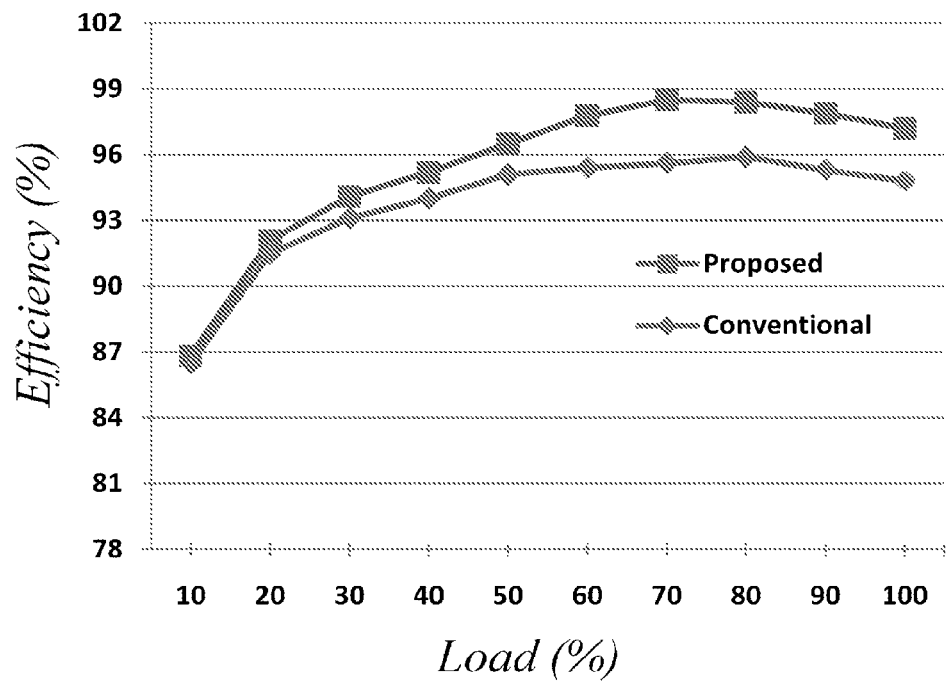
FIG. 13 illustrates efficiency curves for a conventional interleaved boost PFC converter as well as efficiency curves for the circuit in FIG. 2.

FIG. 13 shows the efficiency curves of a conventional interleaved boost PFC converter along with the efficiency curves for the interleaved boost PFC converter according to one aspect of the invention. From the figure, it can be seen that converter of the invention shows better efficiency for the whole load range compared to the conventional converter circuit. The improvement in the efficiency can be attributed to the fact that the converter of the invention eliminates two main sources of losses, the turn-on losses of the boost MOSFETs and the reverse-recovery losses of the output diodes.

It should be noted that while MOSFETs are used in the circuit, other types of transistors may be used. However, MOSFETs are the preferred transistors for this invention as zero voltage switching is more critical and useful to MOSFETs than for other transistors. Also, while the MOSFETs in the converter described above are disclosed as having a separate snubber capacitor, such separate snubber capacitors are preferred but not necessary. The internal capacitance of each MOSFET can serve as the snubber capacitor.

The circuit according to one aspect of the invention is also useful for providing ZVS for other types of switches such as IGBTs (insulated gate bipolar transistors). However, other switches may need other types of soft-switching in order to operate efficiently. As an example, IGBTs require ZCS (zero capacitance switching) at turn off to avoid tailing current losses.

A person understanding this invention may now conceive of alternative structures and embodiments or variations of the above all of which are intended to fall within the scope of the invention as defined in the claims that follow.

We claim:

1. A circuit for use in a power factor correction (PFC) converter circuit having a full bridge diode rectifier subcircuit, the circuit comprising:
    first inductor coupled between a positive input node and a first intermediate node;
    a second inductor coupled between said positive input node and a second intermediate node;
    a first power transistor having a drain lead coupled to said first intermediate node and having a source lead coupled to a negative power node;
    a second power transistor having a source lead coupled to said first intermediate node and a drain lead coupled to a positive output node;
    a third power transistor having a drain lead coupled to said second intermediate node and having a source lead coupled to said negative power node;
    a fourth power transistor having a source lead coupled to said second intermediate node and a drain lead coupled to said positive output node; and
    an auxiliary inductor and an auxiliary capacitor coupled in series to one another between said first intermediate node and said second intermediate node;
wherein
    said full bridge rectifier subcircuit is coupled between said positive input node and said negative power node;
    a load to said circuit is coupled between said positive output node and said negative power node.

2. A circuit according to claim 1 wherein each power transistor is equipped with a snubber diode.

3. A circuit according to claim 1 wherein each power transistor is equipped with a capacitor coupled between each transistor's drain and source leads.

4. A circuit according to claim 1 wherein each power transistor is a metal-oxide-semiconductor field effect transistor (MOSFET).

5. A circuit according to claim 1 wherein said full bridge diode rectifier subcircuit receives an AC input current.

6. A circuit according to claim 1 further including an output capacitor coupled between said positive output node and said negative power node.

7. A circuit according to claim 1 wherein a frequency of switching of said power transistors is adjusted based on a load to said circuit.

8. A circuit according to claim 1 wherein signals produced by said first and second power transistors are 180 degrees out of phase from signals produced by said third and fourth power transistors.

9. A circuit according to claim 1 wherein a frequency of switching of said power transistors is adjusted when a duty cycle for said circuit is lower than 0.5.

10. A power factor correction AC/DC converter circuit comprising:

a full bridge diode rectifier subcircuit for receiving an input AC signal;

a first boost converter subcircuit;

a second boost converter subcircuit; and a passive auxiliary subcircuit coupled between said first and second boost subcircuits, said passive auxiliary subcircuit being for providing reactive current to said boost converter subcircuits for zero voltage switching;

wherein said first and second boost converter subcircuits are coupled in parallel to said rectifier subcircuit;

said passive auxiliary subcircuit comprises an auxiliary inductor and an auxiliary capacitor coupled in series to each other.

11. A circuit according to claim 10 wherein each boost converter subcircuit comprises:

a boost inductor;

a first boost power transistor; and a second boost power transistor.

12. A circuit according to claim 11 wherein each end of said passive auxiliary subcircuit is coupled to a node between said first and second boost power transistor in one of said boost converter subcircuits.

13. A circuit according to claim 10 wherein signals produced by said first boost converter subcircuit are 180 degrees out of phase from signals produced by said second boost converter subcircuit.

14. A circuit according to claim 10 wherein a frequency of switching of said boost power transistors is adjusted based on a load to said circuit.

* * * * *